United States Patent
Morinaga et al.

(10) Patent No.: US 10,894,897 B2
(45) Date of Patent: *Jan. 19, 2021

(54) OIL-BASED INKJET INK

(71) Applicant: RISO KAGAKU CORPORATION, Tokyo (JP)

(72) Inventors: Marie Morinaga, Ibaraki (JP); Shinichiro Shimura, Ibaraki (JP); Kazuyuki Ando, Ibaraki (JP); Hikaru Sugiura, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 280 days.

This patent is subject to a terminal disclaimer.

(21) Appl. No.: 15/904,481

(22) Filed: Feb. 26, 2018

(65) Prior Publication Data

US 2018/0244938 A1    Aug. 30, 2018

(30) Foreign Application Priority Data

Feb. 28, 2017 (JP) ................... 2017-035942
Sep. 28, 2017 (JP) ................... 2017-188371

(51) Int. Cl.
*C09D 11/36* (2014.01)
*C09D 11/322* (2014.01)
*C09D 11/102* (2014.01)
*C09D 11/033* (2014.01)
*C09D 11/037* (2014.01)

(52) U.S. Cl.
CPC ............ *C09D 11/36* (2013.01); *C09D 11/033* (2013.01); *C09D 11/037* (2013.01); *C09D 11/102* (2013.01); *C09D 11/322* (2013.01)

(58) Field of Classification Search
None
See application file for complete search history.

(56) References Cited

U.S. PATENT DOCUMENTS

| | | |
|---|---|---|
| 4,338,133 A | 7/1982 | Toyoda |
| 5,968,244 A | 10/1999 | Ueda et al. |
| 5,980,624 A | 11/1999 | Ichikawa et al. |
| 6,113,679 A | 9/2000 | Adkins |
| 7,834,072 B2 | 11/2010 | Carlini et al. |
| 8,038,784 B2 | 10/2011 | Watanabe et al. |
| 8,440,010 B2 | 5/2013 | Endo |
| 8,507,585 B2 | 8/2013 | Hosoya et al. |
| 9,624,394 B2 | 4/2017 | Endo et al. |
| 9,624,402 B2 | 4/2017 | Shimura et al. |
| 9,821,568 B2 | 11/2017 | Shimura |
| 9,845,402 B2 | 12/2017 | Shimura et al. |
| 2003/0220418 A1 | 11/2003 | Horie |
| 2004/0063811 A1 | 4/2004 | Horie et al. |
| 2004/0068031 A1 | 4/2004 | Horie |
| 2004/0265756 A1 | 12/2004 | Horie |
| 2005/0046675 A1 | 3/2005 | Aoshima |
| 2005/0119363 A1 | 6/2005 | Yamada et al. |
| 2006/0189712 A1 | 8/2006 | Kondo |
| 2007/0022904 A1 | 2/2007 | Kitawaki et al. |
| 2008/0194754 A1 | 8/2008 | Nakamura |
| 2009/0090271 A1 | 4/2009 | Wynants et al. |
| 2009/0263632 A1 | 10/2009 | Kojima et al. |
| 2010/0105807 A1 | 4/2010 | Sugita et al. |
| 2010/0136234 A1 | 6/2010 | Kobayashi |
| 2011/0232528 A1 | 9/2011 | Endo et al. |
| 2012/0006225 A1 | 1/2012 | Tsukiana et al. |
| 2012/0048141 A1 | 3/2012 | Arai et al. |
| 2018/0244936 A1 | 8/2018 | Shimura et al. |
| 2018/0244937 A1 | 8/2018 | Sugiura et al. |
| 2018/0244939 A1 | 8/2018 | Sugiura et al. |
| 2018/0244940 A1 | 8/2018 | Ando et al. |
| 2018/0244941 A1 | 8/2018 | Sugiura et al. |
| 2018/0327617 A1 | 11/2018 | Inoue et al. |
| 2019/0100002 A1 | 4/2019 | Ozawa |
| 2019/0100668 A1 | 4/2019 | Ando |
| 2019/0100671 A1 | 4/2019 | Morinaga |
| 2019/0134989 A1 | 5/2019 | Matsumoto et al. |
| 2019/0300737 A1 | 10/2019 | Ozawa |
| 2020/0040206 A1 | 2/2020 | Sugiura |

FOREIGN PATENT DOCUMENTS

| | | |
|---|---|---|
| AU | 2012247077 B2 | 11/2012 |
| CN | 1576322 A | 2/2005 |
| CN | 101027370 A | 8/2007 |

(Continued)

OTHER PUBLICATIONS

"Silicone Fluid KF-96" from Shin-Etsu Chemical Co., Ltd.; shinetsusilicone-global.com/catalog/pdf/kf96_e.pdf. 2004; 36 pages.*
Office Action in U.S. Appl. No. 15/904,496 dated Sep. 21, 2018.
Jan. 11, 2019 Office Action in copending U.S. Appl. No. 15/904,496, filed Feb. 26, 2018.
English translation of JP 2006/307107, Nov. 2006; 28 pages.
English translation of JP 2016/196564, Nov. 2016; 29 pages.
English translation of JP 2001/098196, Apr. 2001; 12 pages.
English translation of JPH 03/292370, Dec. 1991; 6 pages.
Reactive and Non-Reactive Silicone Fluid from Shin-Etsu Chemical Co. Ltd., shinetsusilicone-global.com/catalog/pdf/modified_e.pdf; 2006; 10 pages.

(Continued)

*Primary Examiner* — Helene Klemanski

(74) *Attorney, Agent, or Firm* — Greenblum & Bernstein, P.L.C.

(57) ABSTRACT

An oil-based inkjet ink can be provided which prevents dye conversion of a dye lake pigment contained in the ink, prevents adhesion of the ink to the nozzle plate, and yields excellent drying properties for printed items. The oil-based inkjet ink contains a dye lake pigment, a pigment dispersant and a non-aqueous solvent, wherein the non-aqueous solvent contains a silicone oil having a surface tension of at least 20 mN/m but not more than 28 mN/m. The surface tension of the silicone oil is preferably at least 22 mN/m but not more than 26 mN/m.

12 Claims, No Drawings

(56) References Cited

FOREIGN PATENT DOCUMENTS

| | | |
|---|---|---|
| CN | 101652437 A | 2/2010 |
| CN | 102199382 A | 9/2011 |
| CN | 104610811(A) | 5/2015 |
| CN | 106084984 A | 11/2016 |
| EP | 1493783 A1 | 1/2005 |
| EP | 3093316 A1 | 11/2016 |
| EP | 3 366 737 | 8/2018 |
| EP | 3 366 739 | 8/2018 |
| EP | 3366733 | 8/2018 |
| EP | 3461868 | 4/2019 |
| JP | 01203482 A | 8/1989 |
| JP | H03-292370 A | 12/1991 |
| JP | H04-161467 A | 6/1992 |
| JP | H04-248879 A | 9/1992 |
| JP | 2001-098196 A | 4/2001 |
| JP | 2001-342388 | 12/2001 |
| JP | 2004-217703 A | 8/2004 |
| JP | 2005-60567 A | 3/2005 |
| JP | 2006-307107 A | 11/2006 |
| JP | 2006-315363 A | 11/2006 |
| JP | 2007-154149 A | 6/2007 |
| JP | 2010001452 | 1/2010 |
| JP | 2010/064478 | 3/2010 |
| JP | 2014-19766 A | 2/2014 |
| JP | 2016-196564 A | 11/2016 |

OTHER PUBLICATIONS

"Phenyl Methyl Silicon Fluid" www.organosilicon.com/en/68083-14-7.htm, no date available; 1 page.
Mar. 11, 2020 Office Action in copending U.S. Appl. No. 15/904,478, filed Feb. 26, 2018.
European Search Report issued with respect to Application No. 18158552.2, dated May 17, 2018.
European Search Report issued with respect to Application No. 18158568.8, dated May 24, 2018.
European Search Report issued with respect to Application No. 18158557.1, dated May 24, 2018.
European Search Report issued with respect to Application No. 18158565.4, dated Jun. 1, 2018.
European Search Report issued with respect to Application No. 18158577.9, dated Jun. 21, 2018.
European Search Report issued with respect to Application No. 18158573.8, dated Jul. 18, 2018.
Official Communication issued in European Patent Office (EPO) Patent Application No. 18 158 557.1, dated Sep. 5, 2019.
English translation of JP-01203482-A, Aug. 1989; 6 pages.
Apr. 7, 2020 Office Action in copending U.S. Appl. No. 15/904,476, filed Feb. 26, 2018.
Apr. 13, 2020 Office Action in copending U.S. Appl. No. 15/904,504, filed Feb. 26, 2018.
English translation of JP 2004/217703, Aug. 2004; 9 pages.
Apr. 13, 2020 Office Action in copending U.S. Appl. No. 15/904,508, filed Feb. 26, 2018.
Apr. 15, 2020 Office Action in copending U.S. Appl. No. 16/141,054, filed Sep. 25, 2018.
Extended European Search Report from European Patent Office (EPO) in European Patent Appl. No. 18192237.8, dated Mar. 14, 2019.
English translation of JPH 04/248879, Sep. 1992; 13 pages.
Apr. 15, 2020 Office Action in copending U.S. Appl. No. 16/141,003, filed Sep. 25, 2018.
English translation of JP 2010/064478, Mar. 2010; 40 pages.
"Development of a Three-Dimensional Bioprinter: Construction of a Cell Supporting Structures Using Hydrogel and State-Of-The-Art Inkjet Technology" by Nishiyama et al.; J. Biomechanical Engineering, 131(3): 035001, Mar. 2009; 6 pages.
Catalogue of Organic Modified Silicone, Dow Corning Toray Co., Ltd., in Japanese, with English Translation of p. 10 (2016).
"Silicon Compounds: Silanes and Silicones," *Gelest, Inc. A Survey of Properties and Chemistry*, 3$^{rd}$ Edition, edited by Barry Arkles & Gerald L. Larson, Gelest, Inc. Morrisville, PA, 608 pages (2013).
Official Action dated Aug. 5, 2020 in the counterpart Chinese application No. 201810159232.X with translation.
Latest Practical Manual of Printing Technology, Letterpress Printing Technology Bulletin, Guangzhou, Tibet, p. 119, Hefei: Anhui Audio-Visual Publishing House, Nov. 2003. See #1, the English translation of SIPO's Office Action at pp. 4-5 as a concise explanation of pertinence of this non-patent literature.
"Silicone Production and Application Technology", Institute of Scientific and Technological Information, Ministry of Chemical Industry, p. 86 Institute of Scientific and Technological Information, Ministry of Chemical Industry, Dec. 1985. See #1, the English translation of SIPO's Office Action at pp. 4-5 as a concise explanation of pertinence of this non-patent literature.
"Modern Fine Chemical Technology and Product Synthesis Processes", Kwong Shenglu, pp. 273-274, Beijing: Science and Technology Literature Publishing House, Dec. 1997. See #1, the English translation of SIPO's Office Action at pp. 4-5 as a concise explanation of pertinence of this non-patent literature.
Office Action dated Oct. 9, 2020 in the counterpart Chinese application No. 201810159076.7 (corresponding to U.S. Appl. No. 15/900,476).
Office Action dated Oct. 14, 2020 in the counterpart Chinese application No. 201810159427.4 (corresponding to U.S. Appl. No. 15/904,478) and its partial machine translation.
Office Action dated Oct. 14, 2020 in the counterpart Chinese application No. 201810161382.4 (corresponding to U.S. Appl. No. 15/904,481) and its partial machine translation.
"Industrial Plastics Dictionary", 1st edition, Su Jiaxai et al., p. 19, Chemical Industry Publishing Co., Ltd., release date: Dec. 31, 1989. See #2, the English translation of SIPO's Office Action as a concise explanation of pertinence of this non-patent literature.
*Functional Polymer Materials* (2nd Edition), Royal Construction, pp. 331-334, Doje University Press, release date: Jun. 30, 2014. See #2 and #3, the English translation of SIPO's Office Action as a concise explanation of pertinence of this non-patent literature.
*Practical Manual For Cosmetics Raw Material Standards*, 1st edition, China Flavored Cosmetics Industry Association, pp. 71-73, China Standard Publishing, release date Mar. 31, 2002. See #2, the English translation of SIPO's Office Action as a concise explanation of pertinence of this non-patent literature.
*Overview Of The Chemical Industry*, 1st edition, Peng Shishimatsu et al., pp. 280-282, Chemical Industry Publishing Company, release date: Jun. 30, 1989. See #3, the English translation of SIPO's Office Action as a concise explanation of pertinence of this non-patent literature.
*Printing Material And Suitability*, 2nd Edition, Jiang Xuecheng et al., pp. 140-143, Tohoku Forestry University Press, Release Date: Aug. 31, 2016. See #3, the English translation of SIPO's Office Action as a concise explanation of pertinence of this non-patent literature.
*Kako Encyclopedia*, (The Eighth Volume), 1st edition, Chemical Encyclopedia Editorial Department, pp. 957-958, Chemical Industry Publishing Company, release date Sep. 30, 1994. See #3, the English translation of SIPO's Office Action as a concise explanation of pertinence of pertinence of this non-patent literature.

\* cited by examiner

OIL-BASED INKJET INK

CROSS REFERENCE TO RELATED APPLICATIONS

This Application is based upon and claims the benefit of priority from prior Japanese Patent Applications No. 2017-035942 filed on Feb. 28, 2017, the entire contents of which are incorporated by reference herein, and prior Japanese Patent Applications No. 2017-188371 filed on Sep. 28, 2017, the entire contents of which are incorporated by reference herein.

BACKGROUND OF THE INVENTION

Field of the Invention

The present invention relates to an oil-based inkjet ink.

Description of the Related Art

The inkjet recording method is a method in which an inkjet ink of high fluidity is jetted from fine nozzles in the form of liquid droplets, thereby recording an image on a recording medium positioned facing the nozzles, and because this method enables high-speed printing to be conducted with little noise, it has rapidly become widespread in recent years. Examples of known types of inks that can be used in this type of inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent. Non-aqueous inks can be classified into solvent-based inks in which the main solvent is a volatile organic solvent, and oil-based inks in which the main solvent is an organic solvent having either low volatility or no volatility. Solvent-based inks mainly dry on the recording medium as a result of evaporation of the organic solvent, whereas oil-based inks mainly dry as a result of penetration into the recording medium.

Among the various colorants for inks that can be used in inkjet recording systems, there is a growing tendency for the use of inks that use pigments as the colorants, as such inks exhibit the excellent levels of light resistance, weather resistance and water resistance that are necessary for high image quality printing.

Dye lake pigments are one of the types of pigments used in oil-based inks. Dye lake pigments are pigments in which a water-soluble dye is insolubilized and adhered to an extender pigment, and these pigments not only provide an enormous range of dye-derived hues, but also exhibit excellent light resistance, weather resistance and water resistance.

Patent Document 1 (JP 2014-19766 A) discloses a non-aqueous inkjet ink in which a xanthene-based pigment that represents one dye lake pigment is used to obtain printed items having a high print density and high saturation. In the ink of Patent Document 1, a non-aqueous solvent composed of a combination of an ester-based solvent, an alcohol-based solvent and a nonpolar solvent is used.

Among oil-based inks, there are all manner of different combinations of pigments and non-aqueous solvents, but among those combinations containing a dye lake pigment as one example of a typical pigment, examples of the non-aqueous solvent include silicone oils. Specific examples are disclosed in Patent Document 2 (JP 2005-60567 A), Patent Document 3 (JP 2006-315363 A) and Patent Document 4 (JP 2006-307107 A).

Patent Document 5 (JP 2004-217703 A) proposes that by using an inkjet non-aqueous pigment ink containing a silicone-based solvent and a pigment, and also containing a specific modified silicone oil as a dispersant, the stability of the ink, and the levels of nozzle blockages and clear file deformation can all be improved.

Patent Document 6 (JP H04-248879 A) proposes that by using an inkjet recording ink containing at least 2 to 95 wt % of a silicone-based solvent with a boiling point of 100° C. to 250° C., and a colorant that is insoluble in the solvent, good print quality can be obtained regardless of the paper quality, satisfactory durability can be achieved several seconds after printing, and vivid images can be obtained with no color mixing in color images.

Patent Document 7 (JP H04-161467 A) proposes that by using an inkjet printer ink that uses an insulating solvent having a siloxane linkage in the molecular skeleton, high-density vivid printing is possible, the printed image has favorable rub fastness, and stable discharge can be achieved.

SUMMARY OF THE INVENTION

One embodiment of the invention provides an oil-based inkjet ink containing a dye lake pigment, a pigment dispersant and a non-aqueous solvent, wherein the non-aqueous solvent contains a silicone oil having a surface tension of at least 20 mN/m but not more than 28 mN/m.

DETAILED DESCRIPTION OF THE EMBODIMENTS

The present invention is described below using embodiments. However, examples presented in the following embodiments in no way limit the present invention.

In Patent Document 1, a non-aqueous ink is prepared by adding a xanthene-based pigment to a non-aqueous solvent composed of a combination of an ester-based solvent, an alcohol-based solvent and a nonpolar solvent. This type of non-aqueous solvent suffers from a slow drying rate for the printed item following printing, meaning the fixation of the printed image immediately after printing is poor. Further, xanthene-based pigments can sometimes undergo conversion to dyes in polar solvents such as ester-based solvents and alcohol-based solvents, and the converted dye component can cause problems such as bleeding at the boundaries between printed regions and unprinted regions of the printed item, and a deterioration in light resistance.

The silicone-based solvents proposed in Patent Documents 5 and 6 are mainly dimethyl silicones. Dimethyl silicones have a high affinity relative to the inkjet nozzle head. Accordingly, these inks that use a dimethyl silicone tend to adhere readily to the nozzle head, which can sometimes result in ink that has adhered to the nozzle head dripping onto the printed item, or ink solidifying in the vicinity of the nozzle head, causing nozzle discharge faults.

The silicone-based solvents described in Patent Documents 2 to 4 are also mostly dimethyl silicones, and therefore suffer the same problems as Patent Documents 5 and 6. The lower the surface tension of the dimethyl silicone, the more likely these problems are to occur.

Moreover, Patent Documents 2 to 6 make no mention of the problem of the dye lake pigment undergoing conversion to a dye within the oil-based ink, and disclose no examples that include a specific combination of a dye lake pigment and a silicone oil.

In Patent Document 7, an insulating solvent having a siloxane linkage in the molecular skeleton is used, but no detailed description is provided as to what types of functional groups are bonded to the siloxane linkage of the solvent, or how many siloxane linkages exist in the solvent. Accordingly, the physical properties and actions of the solvent cannot be identified. Further, Patent Document 7 includes no mention of dye lake pigments.

One object of the present invention is to provide an oil-based inkjet ink that prevents dye conversion of a dye lake pigment contained in the ink, prevents adhesion of the ink to the nozzle plate, and yields excellent drying properties for the printed items.

The oil-based inkjet ink according to one embodiment (hereafter sometimes referred to as simply "the ink") contains a dye lake pigment, a pigment dispersant and a non-aqueous solvent, wherein the non-aqueous solvent contains a silicone oil having a surface tension of at least 20 mN/m but not more than 28 mN/m.

As a result, an oil-based inkjet ink can be provided that prevents dye conversion of the dye lake pigment contained in the ink, prevents adhesion of the ink to the nozzle plate, and yields excellent drying properties for the printed items.

This ink prevents dye conversion of the dye lake pigment, and can therefore enhance the light resistance of the printed image, and the phenomenon in which the printed image suffers from bleeding from the printed regions into the unprinted regions can also be prevented. If the dye lake pigment undergoes dye conversion, then when the ink is applied to a recording medium, the converted dye component permeates into the recording medium, and can cause bleeding from the printed regions into the unprinted regions. Moreover, the converted dye component may also penetrate into the fibers of the recording medium, dyeing the fibers a more vivid color than the pigment and coloring the boundaries between the printed regions and the unprinted regions.

Further, by using a silicone oil having a surface tension of at least 20 mN/m but not more than 28 mN/m, ink wetting of the nozzle plate is reduced, adhesion of the ink to the nozzle plate is prevented, and the drying rate of the printed items can be improved.

The ink contains a dye lake pigment.

Dye lake pigments are pigments produced by insolubilizing a water-soluble dye and adhering the dye to an extender pigment.

Basic dye lake pigments and acidic dye lake pigments and the like may be used as the dye lake pigment.

Dye lake pigments exhibit good dispersibility, and can improve the storage stability of the ink. Further, because dye lake pigments have good dispersibility, they can also prevent aggregation of the pigment, and better prevent adhesion of the ink to the nozzle plate. Furthermore, because dye lake pigments have good dispersibility, when the ink is applied to a recording medium, the pigment separates favorably from the solvent, thereby enhancing the drying properties of the printed item. Basic dye lake pigments have particularly superior dispersibility, and can be used very favorably.

Basic dye lake pigments are pigments produced by insolubilizing a dye having a basic group such as an amino group using a precipitant and adhering the dye to an extender pigment. Examples of materials that may be used as the precipitant include phosphotungstic acid, phosphomolybdic acid, phosphotungstomolybdic acid, silicomolybdic acid, silicotungstomolybdic acid, tannic acid, lauric acid, gallic acid, ferricyanides and ferrocyanides, and synthetic mordants (such as katal and tamol).

Examples of basic dye lake pigments that can be used include pigments obtained by laking a xanthene-based dye (such as rhodamine 6G or rhodamine), a triphenylmethane-based dye (such as methyl violet or malachite green), or a triphenylmethane thiazole-based dye, thiazole-based dye, diphenylmethane-based dye or azomethine-based dye or the like, and adhering the laked dye to an extender pigment.

Acidic dye lake pigments are pigments produced by insolubilizing a dye having an acidic group such as a sulfo group or a carboxyl group using a precipitant and adhering the dye to an extender pigment. Examples of materials that may be used as the precipitant include salts of metals such as calcium, barium, aluminum and sodium.

Examples of acidic dye lake pigments that can be used include pigments obtained by laking a Persian orange-based dye, nitroso-based dye, monoazo-based dye, quinoline-based dye, acidic xanthene-based dye, anthraquinone-based dye (such as alizarin or madder) or indigoid-based dye or the like, and adhering the laked dye to an extender pigment.

Specific examples of dye lake pigments include C.I. Pigment Yellow 18, C.I. Pigment Yellow 100, C.I. Pigment Yellow 104, C.I. Pigment Yellow 115, C.I. Pigment Yellow 117; C.I. Pigment Orange 17:1 (Persian orange lake), C.I. Pigment Orange 39; C.I. Pigment Red 63 (indigo carmine lake), C.I. Pigment Red 81, C.I. Pigment Red 81:1, C.I. Pigment Red 81:2, C.I. Pigment Red 81:3, C.I. Pigment Red 81:4, C.I. Pigment Red 82, C.I. Pigment Red 83, C.I. Pigment Red 84, C.I. Pigment Red 90, C.I. Pigment Red 90:1, C.I. Pigment Red 151, C.I. Pigment Red 169, C.I. Pigment Red 172, C.I. Pigment Red 173, C.I. Pigment Red 174, C.I. Pigment Red 191, C.I. Pigment Red 193; C.I. Pigment Violet 1, C.I. Pigment Violet 2, C.I. Pigment Violet 2:2, C.I. Pigment Violet 3, C.I. Pigment Violet 3:1, C.I. Pigment Violet 3:3, C.I. Pigment Violet 4, C.I. Pigment Violet 5, C.I. Pigment Violet 5:1, C.I. Pigment Violet 6:1, C.I. Pigment Violet 7:1, C.I. Pigment Violet 9, C.I. Pigment Violet 12, C.I. Pigment Violet 20, C.I. Pigment Violet 26, C.I. Pigment Violet 27, C.I. Pigment Violet 39; C.I. Pigment Blue 1, C.I. Pigment Blue 1:2, C.I. Pigment Blue 2, C.I. Pigment Blue 3, C.I. Pigment Blue 8, C.I. Pigment Blue 9, C.I. Pigment Blue 10, C.I. Pigment Blue 11, C.I. Pigment Blue 12, C.I. Pigment Blue 14, C.I. Pigment Blue 53 (brilliant blue lake), C.I. Pigment Blue 62, C.I. Pigment Blue 63; C.I. Pigment Green 1, C.I. Pigment Green 2, C.I. Pigment Green 3, C.I. Pigment Green 4, C.I. Pigment Green 8, C.I. Pigment Green 9, C.I. Pigment Green 10, C.I. Pigment Green 12, C.I. Pigment Green 45; and C.I. Pigment Brown 3.

These pigments may be used individually, or a combination of two or more pigments may be used.

Among these pigments, xanthene-based basic dye lake pigments produced by laking xanthene-based dyes and triphenylmethane-based basic dye lake pigments produced by laking triphenylmethane-based dyes can be used favorably, and xanthene-based basic dye lake pigments are particularly preferred.

Xanthene-based basic dye lake pigments are pigments produced by laking a xanthene-based dye and adhering the laked dye to an extender pigment. Xanthene-based dyes are dyes having a xanthene skeleton represented by the structural formula shown below, and examples include rhodamine-based dyes, fluorescein-based dyes and eosin-based dyes. From the viewpoint of the color tone, rhodamine-based dyes such as rhodamine, rhodamine B and rhodamine 6G are preferred.

[Chemical formula 1]

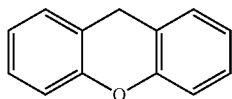

Specific examples of xanthene-based basic dye lake pigments that can be used favorably, selected from among the pigments listed above, include C.I. Pigment Red 81 (rhodamine 6G (PTMA)), C.I. Pigment Red 81:1 (rhodamine 6G (STMA)), C.I. Pigment Red 81:2 (rhodamine (SMA)), C.I. Pigment Red 81:3 (rhodamine (PMA)), C.I. Pigment Red 81:4 (rhodamine (PTMA) and rhodamine 6G (tannic acid)), and C.I. Pigment Red 169 (rhodamine 6G (CFA)).

Of these, C.I. Pigment Red 81, C.I. Pigment Red 81:4 and C.I. Pigment Red 169 can be used particularly favorably.

These pigments may be used individually, or a combination of two or more pigments may be used.

The ink may also contain other pigments, provided they do not impair the effects of the present invention.

For example, in order to improve the density and saturation of the printed image, an azo lake-based pigment may be used in combination with the xanthene-based dye lake pigment.

The azo lake pigment that may be used in combination with the xanthene-based dye lake pigment is preferably a soluble azo pigment, and examples include C.I. Pigment Red 48:1, C.I. Pigment Red 48:2, C.I. Pigment Red 48:3, C.I. Pigment Red 48:4, C.I. Pigment Red 48:5, C.I. Pigment Red 49, C.I. Pigment Red 49:1, C.I. Pigment Red 49:2, C.I. Pigment Red 49:3, C.I. Pigment Red 52:1, C.I. Pigment Red 52:2, C.I. Pigment Red 53:1, C.I. Pigment Red 54, C.I. Pigment Red 57:1, C.I. Pigment Red 58, C.I. Pigment Red 58:1, C.I. Pigment Red 58:2, C.I. Pigment Red 58:3, C.I. Pigment Red 58:4, C.I. Pigment Red 60:1, C.I. Pigment Red 63, C.I. Pigment Red 63:1, C.I. Pigment Red 63:2, C.I. Pigment Red 63:3, C.I. Pigment Red 64:1, C.I. Pigment Red 68, C.I. Pigment Red 200, C.I. Pigment Red 237, C.I. Pigment Red 239 and C.I. Pigment Red 247.

The mass ratio between the xanthene-based dye lake pigment and the azo lake-based pigment is preferably within a range from 10:0 to 3:7, and more preferably from 10:0 to 5:5.

The dispersed form of the pigment may be a dispersion in which a so-called encapsulated pigment in which the pigment is coated with an oil-insoluble resin, or colored resin particles are dispersed using a pigment dispersant, but a dispersion in which the pigment dispersant is adsorbed directly to the pigment surface is preferred.

From the viewpoints of discharge stability and storage stability, the average particle size of the pigment is preferably not more than 300 nm, more preferably not more than 200 nm, and even more preferably 150 nm or less.

The amount of the pigment is typically from 0.01 to 20% by mass of the total mass of the ink, and from the viewpoint of print density, is preferably at least 1% by mass, and more preferably 5% by mass or greater, whereas from the viewpoint of the ink viscosity, is preferably not more than 15% by mass.

In order to ensure stable dispersion of the pigment in the ink, a pigment dispersant may be used together with the pigment.

Examples of pigment dispersants that can be used favorably include hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, copolymers of vinylpyrrolidone and long-chain alkenes, modified polyurethanes, modified polyacrylates, polyether ester anionic surfactants, polyoxyethylene alkyl phosphate esters, and polyester polyamines.

Examples of commercially available pigment dispersants include Antaron V216 (a vinylpyrrolidone-hexadecene copolymer) and V220 (a vinylpyrrolidone-eicosene copolymer) (both product names), manufactured by ISP Japan Ltd.; Solsperse 13940 (a polyester amine-based dispersant), 16000, 17000 and 18000 (fatty acid amine-based dispersants), and 11200, 24000 and 28000 (all product names), manufactured by The Lubrizol Corporation; Efka 400, 401, 402, 403, 450, 451 and 453 (modified polyacrylates) and Efka 46, 47, 48, 49, 4010 and 4055 (modified polyurethanes) (all product names), manufactured by BASF Japan Ltd.; Disparlon KS-860 and KS-873N4 (polyester amine salts) (both product names), manufactured by Kusumoto Chemicals, Ltd.; Discol 202, 206, OA-202 and OA-600 (multichain polymeric nonionic dispersants) (all product names), manufactured by DKS Co., Ltd.; DISPERBYK 2155 and 9077 (both product names). manufactured by BYK-Chemie Japan K.K.; and Hypermer KD2, KD3, KD11 and KD12 (all product names), manufactured by Croda Japan K.K.

The amount of the pigment dispersant need only be sufficient to enable satisfactory dispersion of the pigment within the ink, and may be set as appropriate. For example, the pigment dispersant is typically added in a mass ratio within a range from 0.1 to 5, and preferably from 0.1 to 1, relative to a value of 1 for the pigment. Further, the pigment dispersant is typically added in an amount of 0.01 to 15% by mass, and preferably from 0.01 to 10% by mass, relative to the total mass of the ink.

In an oil-based ink, the amount of resin components, including the pigment dispersant, relative to the total mass of the ink, is typically not more than 15% by mass, and more preferably 10% by mass or less. This can prevent any increase in the ink viscosity, and improve the discharge performance.

The ink contains a silicone oil having a surface tension of at least 20 mN/m but not more than 28 mN/m.

The surface tension of the silicone oil is preferably at least 20 mN/m, and more preferably 22 mN/m or greater. This reduces ink wetting of the nozzle plate, and can prevent adhesion of the ink to the nozzle plate.

The surface tension of the silicone oil is preferably not more than 28 mN/m, and more preferably 26 mN/m or less. This enables the ink to penetrate rapidly into the recording medium, and can enhance the drying rate of the printed item.

The surface tension can be determined by the maximum bubble pressure method. For example, the surface tension can be measured using the Science Line t60 device manufactured by SITA Process Solutions of SITA Messtechnik GmbH.

The surface tension of the overall ink is preferably at least 20 mN/m, and more preferably 22 mN/m or greater, but is not restricted to these values. Further, the surface tension of the overall ink is preferably not more than 30 mN/m, and more preferably 27 mN/m or less.

There are no particular limitations on the silicone oil, provided it has a surface tension that is at least 20 mN/m but not more than 28 mN/m, and a compound having silicon atoms and carbon atoms in each molecule which is liquid at 23° C. can be used.

Compounds have a silyl group, compounds having a silyloxy group, and compounds having a siloxane linkage and the like can be used as the silicone oil, and polysiloxane compounds can be used particularly favorably.

A chain-like silicone oil, cyclic silicone oil, or modified silicone oil or the like may all be used as the silicone oil.

The chain-like silicone oil may have a straight chain or a branched chain, and preferably contains 15 to 30 silicon atoms, and more preferably 17 to 25 silicon atoms. Examples of the chain-like silicone oil include dotriacontane methyl pentadecasoiloxane and hexatriacontane methyl heptadecasiloxane.

The cyclic silicone oil is preferably a cyclic polysiloxane of 5 to 9 silicon atoms, and cyclic polydimethylsiloxanes such as decamethylcyclopentasiloxane, dodecamethylcyclohexasiloxane, hexadecamethylcyclooctasiloxane and octadecamethylcyclononasiloxane can be used favorably.

For the modified silicone oil, a silicone oil obtained by introducing any of various organic groups at a portion of the silicon atoms of a chain-like or cyclic dimethyl silicone can be used. In the modified silicone oil, it is preferable that all of the silicon atoms are bonded only to carbon atoms or oxygen atoms of siloxane linkages. The modified silicone oil is preferably an unreactive silicone oil. The modified silicone oil is preferably composed only of silicon atoms, carbon atoms, oxygen atoms and hydrogen atoms.

Examples of compounds that can be used as the modified silicone oil include compounds in which at least one methyl group within a chain-like or cyclic dimethyl silicone oil has been substituted with one or more groups selected from the group consisting of alkyl groups, carboxylate ester linkage-containing groups, aromatic ring-containing groups, and ether linkage-containing groups.

Examples of other compounds that can be used as the modified silicone oil include compounds in which at least one silicon atom contained in a chain-like or cyclic dimethyl silicone oil has been bonded, via an alkylene group, to the silicon atom of another chain-like or cyclic dimethyl silicone oil. In this case, at least one methyl group contained within the chain-like or cyclic dimethyl silicone oils that are linked via the alkylene group may be substituted with one or more groups selected from the group consisting of alkyl groups, carboxylate ester linkage-containing groups, aromatic ring-containing groups, and ether linkage-containing groups.

Examples of these modified silicone oils include alkyl-modified silicone oils, aryl-modified silicone oils such as phenyl-modified silicone oils and aralkyl-modified silicone oils, carboxylate ester-modified silicone oils, alkylene-modified silicone oils, and polyether-modified silicone oils.

The modified silicone oil preferably contains 2 to 20 silicon atoms, more preferably 2 to 10 silicon atoms, even more preferably 2 to 6 silicon atoms, and most preferably 3 to 6 silicon atoms.

One specific type of modified silicone oil is a silicone oil having 2 to 6 silicon atoms in one molecule, having an organic group in which a carbon atom is bonded directly to a silicon atom and in which the total number of carbon atoms and oxygen atoms is at least 5, and having a total number of carbon atoms and oxygen atoms, contained within all of the organic groups in which the total number of carbon atoms and oxygen atoms is at least 5, that is from 5 to 20 within one molecule. Hereafter, this silicone oil is sometimes referred to as "the modified silicone oil S".

The modified silicone oil S may contain at least one group selected from the group consisting of groups (A) to (D) described below as the organic group in which the total number of carbon atoms and oxygen atoms is at least 5.

(A) Alkyl groups having at least 7 carbon atoms.
(B) Carboxylate ester linkage-containing groups in which the total number of carbon atoms and oxygen atoms is at least 5.
(C) Aromatic ring-containing groups having at least 6 carbon atoms.
(D) Alkylene groups having at least 7 carbon atoms.

From the viewpoint of preventing adhesion of the ink to the nozzle plate, the modified silicone oil S preferably has a total number of carbon atoms and oxygen atoms, contained within all of the organic groups in which the total number of carbon atoms and oxygen atoms is at least 5, that is from 5 to 12 within one molecule.

Further, from the viewpoints of lowering the ink viscosity and improving the discharge performance, the modified silicone oil S preferably has a total number of carbon atoms and oxygen atoms, contained within all of the organic groups in which the total number of carbon atoms and oxygen atoms is at least 5, that is from 8 to 20 within one molecule.

In those cases where one molecule of the modified silicone oil S contains two or more of the organic groups in which the total number of carbon atoms and oxygen atoms is at least 5, the total number of carbon atoms and oxygen atoms, in one molecule, that are contained within all of the organic groups in which the total number of carbon atoms and oxygen atoms is at least 5 refers to the total number of carbon atoms and oxygen atoms contained in the two or more organic groups each having a total number of carbon atoms and oxygen atoms of at least 5.

Examples of the modified silicone oil S include silicone oils represented by general formula (X) shown below.

[Chemical formula 2]

General formula (X)

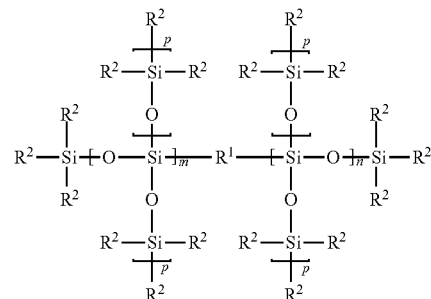

In general formula (X), $R^1$ represents an oxygen atom or a divalent organic group having a carbon atom bonded directly to each silicon atom, each $R^2$ independently represents a monovalent organic group having a carbon atom bonded directly to the silicon atom, each of m and n independently represents an integer of 0 to 4, each p independently represents an integer of 0 to 2, the number of silicon atoms within one molecule is from 2 to 6, at least one of $R^1$ and $R^2$ is an organic group in which the total number of carbon atoms and oxygen atoms is at least 5, and the total number of carbon atoms and oxygen atoms, contained within all of the organic groups in which the total number of carbon atoms and oxygen atoms is at least 5, is from 5 to 20 within one molecule.

In general formula (X), it is preferable that $R^1$ is an oxygen atom, or a divalent organic group in which the total number of carbon atoms and oxygen atoms is at least 5, and each $R^2$ independently represents a methyl group, or a monovalent organic group in which the total number of carbon atoms and oxygen atoms is at least 5.

It is preferable that in general formula (X), $R^1$ is an oxygen atom or an alkylene group having at least 7 carbon atoms, and each $R^2$ independently represents a methyl group, an alkyl group having at least 7 carbon atoms, a carboxylate ester linkage-containing group in which the total number of carbon atoms and oxygen atoms is at least 5, or an aromatic ring-containing group having at least 6 carbon atoms, wherein at least one of $R^1$ and $R^2$ is a group selected from the group consisting of alkylene groups having at least 7 carbon atoms, alkyl groups having at least 7 carbon atoms, carboxylate ester linkage-containing groups in which the total number of carbon atoms and oxygen atoms is at least 5, and aromatic ring-containing groups having at least 6 carbon atoms, and the total number of carbon atoms and oxygen atoms in one molecule that are contained within all of the alkylene groups having at least 7 carbon atoms, alkyl groups having at least 7 carbon atoms, carboxylate ester linkage-containing groups in which the total number of carbon atoms and oxygen atoms is at least 5, and aromatic ring-containing groups having at least 6 carbon atoms, is from 5 to 20.

Other examples of the modified silicone oil S include silicone oils represented by general formula (X-1) shown below.

[Chemical formula 3]

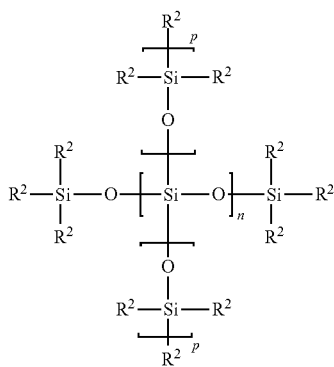

General formula (X-1)

In general formula (X-1), each $R^2$ independently represents a monovalent organic group having a carbon atom bonded directly to the silicon atom, n represents an integer of 0 to 4, each p independently represents 0 or 1, the number of silicon atoms within one molecule is from 2 to 6, at least one of $R^2$ is an organic group in which the total number of carbon atoms and oxygen atoms is at least 5, and the total number of carbon atoms and oxygen atoms, contained within all of the organic groups in which the total number of carbon atoms and oxygen atoms is at least 5, is from 5 to 20 within one molecule.

In general formula (X-1), it is preferable that each $R^2$ independently represents a methyl group or a monovalent organic group in which the total number of carbon atoms and oxygen atoms is at least 5.

In general formula (X-1), at least one of $R^2$ is preferably at least one group selected from the group consisting of alkyl groups having at least 7 carbon atoms, carboxylate ester linkage-containing groups in which the total number of carbon atoms and oxygen atoms is at least 5, and aromatic ring-containing groups having at least 6 carbon atoms.

In the modified silicone oil S, the alkyl group of at least 7 carbon atoms may have a straight chain or branched chain, and may be chain-like or alicyclic.

The number of carbon atoms in this alkyl group is preferably at least 7, more preferably at least 8, and even more preferably 10 or greater.

Further, the number of carbon atoms in this alkyl group is preferably not more than 20, more preferably not more than 16, and even more preferably 12 or fewer.

Examples of the alkyl group having at least 7 carbon atoms include a heptyl group, octyl group, isooctyl group, nonyl group, decyl group, dodecyl group, hexadecyl group and eicosyl group.

Preferred groups include an octyl group, decyl group, dodecyl group and hexadecyl group, and a decyl group or dodecyl group is particularly preferred.

For example, compounds represented by general formula (1) shown below can be used as the modified silicone oil S having an alkyl group.

[Chemical formula 4]

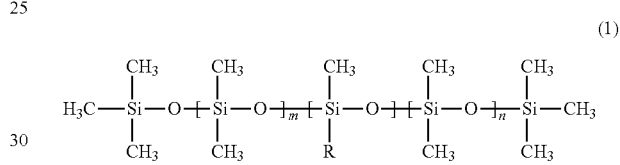

(1)

In general formula (1), R represents an alkyl group having a straight chain or branched chain of 7 to 20 carbon atoms, and each of m and n independently represents an integer of 0 to 2, provided that m+n≤2.

In general formula (1), R represents an alkyl group having a straight chain or branched chain of 7 to 20 carbon atoms. By ensuring that the number of carbon atoms in the alkyl group represented by R is at least 7, preferably at least 8, and even more preferably 10 or greater, the wetting characteristics of the ink on the nozzle plate can be improved. In particular, a carbon number of 10 or greater increases the surface tension, thereby improving the wetting characteristics.

Further, by ensuring that the number of carbon atoms in the alkyl group represented by R is not more than 20, preferably not more than 16, and even more preferably 12 or fewer, any increase in the ink viscosity can be suppressed, and the discharge performance can be improved.

In the modified silicone oil S, for the carboxylate ester linkage-containing group, a group represented by —$R^{Bb}$—O—(CO)—$R^{Ba}$ or a group represented by —$R^{Bb}$—(CO)—O—$R^{Ba}$, in which the carboxylate ester linkage is bonded to a silicon atom of the main-chain siloxane linkage via an alkylene group, can be used particularly favorably.

Here, $R^{Ba}$ may have a straight chain or branched chain having at least 1 carbon atom, and is preferably a chain-like or alicyclic alkyl group. Further $R^{Bb}$ may have a straight chain or branched chain having at least 1 carbon atom, and is preferably a chain-like or alicyclic alkylene group. The alkylene group linking the silicon atom of the main-chain siloxane linkage and the carboxylate ester linkage more preferably has at least 2 carbon atoms.

The total number of carbon atoms and oxygen atoms in the carboxylate ester linkage-containing group is the total of the one carbon atom and two oxygen atoms in the ester linkage (—O—(CO)—), the number of carbon atoms in the alkyl group ($R^{Ba}$), and the number of carbon atoms in the alkylene group ($R^{Bb}$).

In the carboxylate ester linkage-containing group, examples of the alkyl group ($R^{Ba}$) include a methyl group, ethyl group, propyl group, isopropyl group, n-butyl group, isobutyl group, tert-butyl group, pentyl group, hexyl group, heptyl group, octyl group, isooctyl group, nonyl group, decyl group, dodecyl group, hexadecyl group and heptadecyl group.

Preferred alkyl groups include a pentyl group, heptyl group, nonyl group and tridecyl group, and a heptyl group or nonyl group is particularly preferred.

In the carboxylate ester linkage-containing group, the alkylene group ($R^{Bb}$) is preferably a linear alkylene group of 1 to 8 carbon atoms, and examples include a methylene group, ethylene group, propylene group, trimethylene group, n-butylene group, isobutylene group, pentylene group, hexylene group, heptylene group, octylene group and isooctylene group. An ethylene group is preferred.

Examples of compounds that can be used favorably as the modified silicone oil S having a carboxylate ester linkage-containing group include compounds of the above general formula (X-1) in which each $R^2$ independently represents a methyl group or a carboxylate ester linkage-containing group in which a carbon atom is bonded directly to a silicon atom and in which the total number of carbon atoms and oxygen atoms is at least 5, n represents an integer of 0 to 4, each p independently represents 0 or 1, the number of silicon atoms within one molecule is from 2 to 6, at least one of $R^2$ is an aforementioned carboxylate ester linkage-containing group, and the total number of carbon atoms and oxygen atoms contained within all of the carboxylate ester linkage-containing groups within one molecule is from 5 to 20.

Examples of the modified silicone oil S having a carboxylate ester linkage-containing group include compounds represented by general formula (B1) shown below.

[Chemical formula 5]

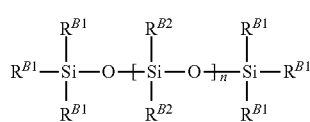

General formula (B1)

In general formula (B1), each $R^{B1}$ independently represents a methyl group or a carboxylate ester linkage-containing group in which a carbon atom is bonded directly to the silicon atom and in which the total number of carbon atoms and oxygen atoms is at least 5, each $R^{B2}$ independently represents a methyl group, a trimethylsilyloxy group, or a carboxylate ester linkage-containing group in which a carbon atom is bonded directly to the silicon atom and in which the total number of carbon atoms and oxygen atoms is at least 5, at least one of $R^{B1}$ and $R^{B2}$ is an aforementioned carboxylate ester linkage-containing group in which the total number of carbon atoms and oxygen atoms is at least 5, n represents an integer of 0 to 4, and the number of silicon atoms within one molecule is from 2 to 6.

The carboxylate ester linkage-containing group is as described above.

In the modified silicone oil S, for the aromatic ring-containing group, a group represented by —$R^{Ca}$ in which the aromatic ring is bonded directly to a silicon atom of the main-chain siloxane linkage, or a group represented by —$R^{Cb}$—$R^{Ca}$, in which the aromatic ring is bonded to a silicon atom of the main-chain siloxane linkage via an alkylene group, can be used particularly favorably.

Here, $R^{Ca}$ is preferably an aromatic ring having at least 6 carbon atoms. Further, $R^{Cb}$ may have a straight chain or branched chain having at least 1 carbon atom, and is preferably a chain-like or alicyclic alkylene group.

When the aromatic ring-containing group is a group represented by —$R^{Ca}$ in which the aromatic ring is bonded directly to a silicon atom of the main-chain siloxane linkage, it is preferable that a branched chain such as a trimethylsilyloxy group branches from the main-chain siloxane linkage as a side chain. It is even more preferable that the aromatic ring-containing containing group is a group represented by in which the aromatic ring is bonded to a silicon atom of the main-chain siloxane linkage via an alkylene group.

The number of carbon atoms in the aromatic ring-containing group is the total of the number of carbon atoms in the aromatic ring ($R^{Ca}$) and the number of carbon atoms in the optional alkylene group ($R^{Cb}$).

In the aromatic ring-containing group, examples of the aromatic ring portion ($R^{Ca}$) include a phenyl group, tolyl group, xylyl group, trimethylphenyl group, biphenylyl group, naphthyl group or anthracenyl group, or a functional group in which at least one hydrogen atom of one of these groups has been substituted with an alkyl group.

In the aromatic ring-containing group, the optional alkylene group ($R^{Cb}$) is preferably an alkylene group of 1 to 8 carbon atoms that may have a straight chain or a branched chain, and examples include a methylene group, ethylene group, propylene group, trimethylene group, n-butylene group, isobutylene group, pentylene group, hexylene group, heptylene group, octylene group and isooctylene group.

A propylene group, methylethylene group or ethylene group is preferred.

Examples of compounds that can be used favorably as the modified silicone oil S having an aromatic ring-containing group include compounds of the above general formula (X-1) in which each $R^2$ independently represents a methyl group or an aromatic ring-containing group of at least 6 carbon atoms in which a carbon atom is bonded directly to a silicon atom, n represents an integer of 0 to 4, each p independently represents 0 or 1, the number of silicon atoms within one molecule is from 2 to 6, at least one of $R^2$ is an aforementioned aromatic ring-containing group, and the total number of carbon atoms contained within all of the aromatic ring-containing groups within one molecule is from 6 to 20.

Examples of the modified silicone oil S having an aromatic ring-containing group include compounds represented by general formula (C1) shown below.

[Chemical formula 6]

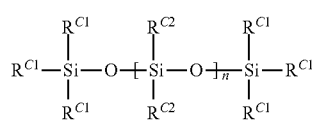

General formula (C1)

In general formula (C1), each $R^{C1}$ independently represents a methyl group or an aromatic ring-containing group of at least 6 carbon atoms in which a carbon atom is bonded directly to the silicon atom, each $R^{C2}$ independently represents a methyl group, a trimethylsilyloxy group, or an aromatic ring-containing group of at least 6 carbon atoms in which a carbon atom is bonded directly to the silicon atom, at least one of $R^{C1}$ and $R^{C2}$ is an aforementioned aromatic ring-containing group of at least 6 carbon atoms, n represents an integer of 0 to 4, and the number of silicon atoms within one molecule is from 2 to 6.

The aromatic ring-containing group is as described above.

A compound having a trisiloxane skeleton, in which n=1 in general formula (C1), is preferred.

Further, methyl phenyl silicones such as diphenyl dimethicone, trimethylsiloxyphenyl dimethicone, and 1,1,1,5,5,5-hexamethyl-3-phenyl-3-(trimethylsilyloxy)trisiloxane can also be used as the modified silicone oil S having an aromatic ring-containing group.

One embodiment of the modified silicone oil S is a compound having 2 to 6 silicon atoms and an alkylene group of at least 7 carbon atoms, and is preferably a compound in which a silyl group or at least one siloxane linkage is bonded to the carbon atom at each of the two terminals of an alkylene group having at least 7 carbon atoms.

Examples of the alkylene group of at least 7 carbon atoms include a heptylene group, octylene group, isooctylene group, nonylene group, decylene group, dodecylene group, hexadecylene group and eicosylene group.

An octylene group, decylene group or dodecylene group is preferred, and an octylene group or decylene group is particularly desirable.

Examples of compounds that can be used favorably as the modified silicone S having an alkylene group include compounds of the above general formula (X) in which $R^1$ represents an alkylene group having at least 7 carbon atoms, $R^2$ represents a methyl group, each of m and n independently represents an integer of 0 to 4, each p independently represents an integer of 0 to 2, and the number of silicon atoms within one molecule is from 2 to 6.

The modified silicone oil S described above can be produced using the method described below, but the invention is not restricted to this particular method.

For example, the modified silicone oil S can be obtained by reacting a siloxane raw material with a reactive compound having both an organic group in which the total number of carbon atoms and oxygen atoms is at least 5 and a reactive group, in an organic solvent. The siloxane raw material and the reactive compound are preferably reacted so that the molar ratio between the reactive groups of the siloxane raw material and the reactive groups of the reactive compound is within a range from 1:1 to 1:1.5. Further, during the reaction, a catalyst such as a platinum catalyst like a zero-valent platinum olefin complex, a zero-valent platinum vinylsiloxane complex, a divalent platinum olefin complex halide or platinic chloride can be used favorably.

Examples of compounds that can be used as the siloxane raw material include 1,1,1,3,5,5,5-heptamethyltrisiloxane, 1,1,1,3,3,5,7,7,7-nonamethyltetrasiloxane, 1,1,1,3,3,5,7,7,9,9,9-undecamethylpentasiloxane, pentamethyldisiloxane, 1,1,3,3,5,5,5-heptamethyltrisiloxane, 1,1,3,3,-tetramethyldisiloxane, 1,1,3,3,5,5-hexamethyltrisiloxane, 1,1,3,3,5,5,7,7-octamethyltetrasiloxane, 1,1,3,3,5,5,7,7,9,9-decamethylpentasiloxane, 1,1,1,5,5,5-hexamethyl-3-(trimethylsilyloxy)trisiloxane, 1,1,1,5,5,5-hexamethyltrisiloxane, 1,1,1,3,5,7,7,7-octamethyltetrasiloxane, 1,1,3,5,5-pentamethyl-3-(dimethylsilyloxy)trisiloxane, and 1,1,3,3,5,5,7,7,9,9,11,11-dodecamethylhexasiloxane.

The reactive compound preferably contains a carbon double bond as the reactive group.

Examples of reactive compounds that can be used for introducing an alkyl group into the modified silicone oil S include alkenes such as 1-heptene, 1-octene, 2-octene, 1-nonene, 1-decene, 1-dodecene, 1-hexadecene and 1-eicosene.

Further, besides alkenes, alicyclic hydrocarbons having an ethylenic double bond such as vinylcyclohexane can also be used.

Examples of reactive compounds that can be used for introducing an ester linkage-containing group into the modified silicone oil S include vinyl esters of aliphatic acids and allyl esters of aliphatic acids in which the total number of carbon atoms and oxygen atoms is at least 6, such as vinyl acetate, vinyl propionate, vinyl butyrate, vinyl isobutanoate, vinyl pentanoate, vinyl pivalate, vinyl hexanoate, vinyl heptanoate, vinyl 2-ethylhexanoate, vinyl octanoate, vinyl isooctanoate, vinyl nonanoate, vinyl decanoate, vinyl laurate, vinyl myristate, vinyl palmitate, vinyl eicosanoate and allyl hexanoate.

Examples of reactive compounds that can be used for introducing an aromatic ring-containing group into the modified silicone oil S include aryl compounds having a vinyl bond and an aromatic ring of at least 6 carbon atoms, such as styrene, 4-methylstyrene, 2-methylstyrene, 4-tert-butylstyrene, allylbenzene, 1-allylnaphthalene, 4-phenyl-1-butene, 2,4-diphenyl-4-methyl-1-pentene, 1-vinylnaphthalene, α-methylstyrene, 2-methyl-1-phenylpropene, 1,1-diphenylethylene, triphenylethylene, 2,4,6-trimethylstyrene, cis-β-methylstyrene, trans-β-methylstyrene, and 3-phenyl-1-propene.

Examples of reactive compounds that can be used for introducing an alkylene group into the modified silicone oil S include diene compounds having at least 7 carbon atoms, such as 1,6-heptadiene, 1,7-octadiene, 1,8-nonadiene, 1,9-decadiene, 1,11-dodecadiene, 1,10-undecadiene, 1,13-tetradecadiene, hexadecadiene, and eicosadiene.

Commercially available products may be used as the silicone oil, and examples of products that may be used include "KF-96L-10CS" and "KF-56A" manufactured by Shin-Etsu Chemical Co., Ltd., "DC3435 Fluid" and "FZ-3196" manufactured by Dow Corning Toray Co., Ltd., and 1,1,1,5,5,5-hexamethyl-3-phenyl-3-(trimethylsilyloxy)trisiloxane, decamethylcyclopentasiloxane and dodecamethylcyclohexasiloxane manufactured by Tokyo Chemical Industry Co., Ltd.

The amount of the silicone oil, relative to the total mass of the non-aqueous solvent, is preferably at least 15% by mass. This enables the drying properties of the printed items to be enhanced, while preventing dye conversion of the dye lake pigment. The amount of the silicone oil relative to the total mass of the non-aqueous solvent is more preferably at least 30% by mass, even more preferably at least 50% by mass, and most preferably 70% by mass or greater.

The silicone oil is included in an amount of not more than 100% by mass relative to the total mass of the non-aqueous solvent. The silicone oil may be included in an amount of not more than 90% by mass relative to the total mass of the non-aqueous solvent.

Because the silicone oil may exhibit affinity for the nozzle plate, depending on the material of the nozzle plate, restricting the amount of the silicone oil to some degree can improved the wetting characteristics of the ink on the nozzle plate.

The amount of the silicone oil relative to the total mass of the ink varies depending on the total amount of non-aqueous solvent used, but is typically from 12 to 98% by mass, and may be from 15 to 90% by mass.

The ink may also contain other non-aqueous solvents.

Both non-polar organic solvents and polar organic solvents can be used as these other non-aqueous solvents. In the embodiments of the present invention, a water-insoluble organic solvent that does not mix uniformly with an equal volume of water at 1 atmosphere and 20° C. is preferably used as this other non-aqueous solvent.

Examples of preferred non-polar organic solvents include petroleum-based hydrocarbon solvents such as aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based, isoparaffin-based, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JXTG Nippon Oil & Energy Corporation); Isopar G, Isopar H, Isopar L, Isopar M, Exxsol D40, Exxsol D60, Exxsol D80, Exxsol D95, Exxsol D110 and Exxsol D130 (all manufactured by Exxon Mobil Corporation); and MORESCO White P-40, MORESCO White P-60, MORESCO White P-70, MORESCO White P-80, MORESCO White P-100, MORESCO White P-120, MORESCO White P-150, MORESCO White P-200, MORESCO White P-260 and MORESCO White P-350P (all manufactured by MORESCO Corporation).

Examples of preferred aromatic hydrocarbon solvents include Grade Alkene L and Grade Alkene 200P (both manufactured by JXTG Nippon Oil & Energy Corporation), and Solvesso 100, Solvesso 150, Solvesso 200 and Solvesso 200ND (manufactured by Exxon Mobil Corporation).

The initial boiling point of the petroleum-based hydrocarbon solvent is preferably at least 100° C., more preferably at least 150° C., and even more preferably 200° C. or higher. The initial boiling point can be measured in accordance with JIS K0066 "Test Methods for Distillation of Chemical Products".

Examples of polar organic solvents that can be used favorably include fatty acid ester-based solvents, higher alcohol-based solvents and higher fatty acid-based solvents.

By using a polar organic solvent together with the silicone oil, ink wetting of the nozzle plate can be reduced, enabling adhesion of the ink to the nozzle plate to be better prevented. Among the various polar organic solvents, higher alcohol-based solvents having at least 6 carbon atoms, and preferably 12 to 20 carbon atoms, within each molecule have high polarity and a high surface tension, and can further reduce ink wetting of the nozzle plate.

These higher alcohol-based solvents having at least 6 carbon atoms may have a straight chain or branched chain, and may be saturated or unsaturated. Further, the higher alcohol-based solvents having at least 6 carbon atoms may be monohydric, dihydric, trihydric or polyhydric alcohols, but in terms of achieving a lower viscosity, a monohydric alcohol is preferred.

Specific examples of these higher alcohol-based solvents having at least 6 carbon atoms include 1-hexanol, n-octanol, isooctyl alcohol, 1-decanol, dodecanol, isomyristyl alcohol, isopalmityl alcohol, isostearyl alcohol, oleyl alcohol, isoeicosyl alcohol and decyltetradecanol.

In those cases where the silicone oil is included in an amount of at least 50% by mass relative to the total mass of the non-aqueous solvent, adding an alcohol-based solvent having at least 6 carbon atoms in each molecule in the blend proportion mentioned below can improve the bleeding and light resistance of the printed image, as well as improving the wetting characteristics of the ink on the nozzle plate.

The alcohol-based solvent having at least 6 carbon atoms in each molecule is preferably added in an amount of at least 2% by mass, and more preferably at least 5% by mass, relative to the total mass of the non-aqueous solvent.

Further, the alcohol-based solvent having at least 6 carbon atoms in each molecule is preferably added in an amount of not more than 15% by mass, and more preferably not more than 10% by mass, relative to the total mass of the non-aqueous solvent.

Examples of other polar organic solvents include fatty acid ester-based solvents having at least 13 carbon atoms, and preferably 16 to 30 carbon atoms, within one molecule, such as isononyl isononanoate, isodecyl isononanoate, isotridecyl isononanoate, methyl laurate, isopropyl laurate, hexyl laurate, isopropyl myristate, isopropyl palmitate, hexyl palmitate, isooctyl palmitate, isostearyl palmitate, methyl oleate, ethyl oleate, isopropyl oleate, butyl oleate, hexyl oleate, methyl linoleate, ethyl linoleate, isobutyl linoleate, butyl stearate, hexyl stearate, isooctyl stearate, isopropyl isostearate, 2-octyldecyl pivalate, methyl soybean oil, isobutyl soybean oil, methyl tallate and isobutyl tallate; and higher fatty acid-based solvents having at least 12 carbon atoms, and preferably 14 to 20 carbon atoms, within one molecule, such as lauric acid, isomyristic acid, palmitic acid, isopalmitic acid, α-linolenic acid, linoleic acid, oleic acid and isostearic acid.

The boiling point of these polar organic solvents such as the fatty acid ester-based solvents, higher alcohol-based solvents and higher fatty acid-based solvents is preferably at least 150° C., more preferably at least 200° C., and even more preferably 250° C. or higher. These non-aqueous solvents having a boiling point of 250° C. or higher also include non-aqueous solvents that do not exhibit an actual boiling point.

These non-aqueous solvents may be used individually, or a combination of two or more solvents may be used, provided the solvents form a single phase.

In addition to the various components described above, the ink may also include various additives, provided these additives do not impair the effects of the present invention. For example, additives such as nozzle blockage inhibitors, antioxidants, conductivity modifiers, viscosity modifiers, surface tension regulators, and oxygen absorbers and the like may be added as appropriate. There are no particular limitations on these additives, and materials typically used in this technical field may be used.

The ink can be produced by mixing the various components including the pigment and the non-aqueous solvent. The ink is preferably produced by mixing and stirring the components together, either in a single batch or in a number of separate batches. Specifically, the ink can be produced by dispersing all of the components in a dispersion device such as a beads mill, either in a single batch or in a number of separate batches, and then, if desired, passing the resulting dispersion through a filtration device such as a membrane filter.

The ideal range for the viscosity of the oil-based inkjet ink varies depending on factors such as the diameter of the nozzles within the discharge head of the inkjet recording system and the discharge environment, but generally, the viscosity at 23° C. is preferably within a range from 5 to 30 mPa·s, more preferably from 5 to 15 mPa·s, and most preferably about 10 mPa·s.

There are no particular limitations on the printing method used with the inkjet ink, and any of various printing systems, including a piezo system, electrostatic system or thermal system may be used, but a piezo system is preferred. In those cases where an inkjet recording device is used, the ink of the present invention is preferably discharged from the inkjet head based on a digital signal, with the discharged ink droplets being adhered to a recording medium.

In the embodiments of the present invention, there are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface. Among these, from the viewpoint of ink penetration, a printing paper such as a plain paper or a coated paper can be used particularly favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several μm to several tens of μm are formed with a spacing between fibers of several tens to several hundred μm, and therefore the ink can penetrate readily.

Further, in terms of coated papers, coated papers designed for inkjets, such as matte papers, glossy papers and semi-glossy papers, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like.

EXAMPLES

The present invention is described below in further detail using a series of examples. The present invention is in no way limited by the following examples.

[Preparation of Inks]

Ink formulations are shown in Table 1 to Table 3.

The pigments, pigment dispersants, and the various solvents shown in each of the tables were mixed together in accordance with the amounts shown in each table, and the pigment was dispersed thoroughly using a beads mill (Dyno-Mill KDL-A, manufactured by Shinmaru Enterprises Corporation) under conditions including a residence time of 15 minutes. Subsequently, coarse particles were removed with a membrane filter to obtain the ink.

Details relating to the non-aqueous solvents and pigments shown in each table are listed in Table 4 and Table 5.

The surface tension of each solvent shown in Table 4 was determined using a Science Line t60 device manufactured by SITA Process Solutions of SITA Messtechnik GmbH, under measurement conditions of 23° C. and 0.05 Hz.

Further, the pigment dispersants shown in the tables were as follows.

S18000: Solsperse 18000, manufactured by The Lubrizol Corporation, effective component: 100% by mass.

Disperbyk 2155: Disperbyk 2155, manufactured by BYK-Chemie Japan K.K., effective component: 100% by mass.

Production Example 1

A method for synthesizing the carboxylate ester-modified silicone oil shown in each table is described below.

A four-necked flask was charged with 50 parts by mass of hexane, 10 parts by mass of 1,1,1,3,5,5,5-heptamethyltrisiloxane (manufactured by Tokyo Chemical Industry Co., Ltd.) and 8.4 parts by mass of vinyl n-octanoate (manufactured by Tokyo Chemical Industry Co., Ltd.). Subsequently, 0.02 parts by mass of the platinum catalyst 1,3-divinyl-1,1,3,3-tetramethyldisiloxane platinum complex (manufactured by Sigma-Aldrich Corporation) was added to the flask, and the resulting mixture was stirred at room temperature for 2 to 3 hours. The hexane that acted as the reaction solvent and any unreacted raw materials were then removed by distillation under reduced pressure, obtaining a carboxylate ester-modified silicone oil.

Production Example 2

A method for synthesizing the aryl-modified silicone oil shown in each table is described below.

A four-necked flask was charged with 50 parts by mass of hexane, 10 parts by mass of 1,1,3,3,5,5-hexamethyltrisiloxane (manufactured by Tokyo Chemical Industry Co., Ltd.) and 12.5 parts by mass of 3-phenyl-1-propene (manufactured by Tokyo Chemical Industry Co., Ltd.). Subsequently, 0.02 parts by mass of the platinum catalyst 1,3-divinyl-1,1,3,3-tetramethyldisiloxane platinum complex (manufactured by Sigma-Aldrich Corporation) was added to the flask, and the resulting mixture was stirred at room temperature for 2 to 3 hours. The hexane that acted as the reaction solvent and any unreacted raw materials were then removed by distillation under reduced pressure, obtaining an aryl-modified silicone oil that represented by the target product.

The structural formulas for the obtained carboxylate ester-modified silicone and aryl-modified silicone are shown below. In the following formulas, Me represents a methyl group.

[Chemical formula 7]

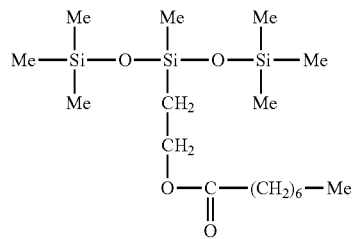

Carboxylate ester-modified silicone

-continued

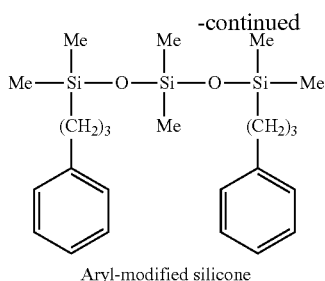

Aryl-modified silicone

[Evaluations]

The inks from each of the examples and comparative examples were evaluated using the methods described below. The evaluation results are also shown in the tables.

(Storage Stability)

Each ink was placed in a sealed container and left to stand for four weeks in an environment at 70° C. The viscosity of the ink prior to this standing period (the initial viscosity) and the viscosity after the standing period (viscosity after 4 weeks) were measured, and the change in viscosity was determined using the formula below. Based on this change in viscosity, the storage stability was evaluated against the following criteria.

The ink viscosity refers to the viscosity at 23° C., and was measured using a "Rheometer MCR302" manufactured by Anton Paar Japan K.K. (cone angle: 1°, diameter: 50 mm)

Change in viscosity=[(viscosity after 4 weeks×100)/(initial viscosity)]−100(%)

A: change in viscosity of less than 5%
B: change in viscosity of at least 5% but less than 10%
C: change in viscosity of at least 10%

(Wetting Characteristics of Ink on Nozzle Plate)

Each ink was placed in a 30 ml glass container, one end of a nozzle plate (length 5 cm, width 5 mm) used in an inkjet printer "ORPHIS EX9050" (a product name, manufactured by RISO KAGAKU CORPORATION) was grasped with a set of tweezers, and the opposite end of the nozzle plate was immersed in the ink to a depth of 2 cm for 5 seconds. Subsequently, the nozzle plate was pulled rapidly out of the ink, and the time t taken for the residual ink film on the nozzle plate to form ink droplets was measured. The same operation was repeated 10 times using the same nozzle plate, and the value of t was measured for each repetition. The average of the 10 t values was calculated and recorded as the ink repellency time. Using this ink repellency time, the wetting characteristics of the ink on the nozzle plate were evaluated against the following criteria.

S: ink repellency time of less than 3 seconds.
A: ink repellency time of at least 3 seconds but less than 5 seconds
B: ink repellency time of at least 5 seconds but less than 10 seconds
C: ink repellency time of at least 10 seconds (Drying Rate)

Each ink was loaded into a line-type inkjet printer "ORPHIS EX9050" (manufactured by RISO KAGAKU CORPORATION), and a solid image was printed onto a plain paper "RISO Paper Thin Type" (manufactured by RISO KAGAKU CORPORATION) at a print speed of 150 ppm and a resolution of 300 dpi×300 dpi.

The obtained printed item was rubbed with a white cotton cloth 10 times in 10 seconds using a crockmeter CM-1 (manufactured by Atlas Electric Devices Company). The first rubbing repetition with the white cotton cloth was performed 30 seconds after printing.

The rubbing white cotton cloth was measured using a colorimeter X-Rite eXact (manufactured by Videojet X-Rite K.K.), and the color difference ΔE from an unrubbed cloth portion was determined. A smaller color difference ΔE indicates a faster drying rate and superior image fixability.

A: ΔE of less than 3
B: ΔE of at least 3 but less than 7
C: ΔE of at least 7

(Bleeding)

Using each ink, a printed item was produced in the same manner as that described above for the drying rate.

The boundaries between the printed region and unprinted region on the printed surface of the printed item were inspected using a portable digital microscope ViTiny manufactured by 3R Systems Co., Ltd., and bleeding at the boundaries was evaluated against the following criteria. Bleeding at the boundaries on the printed surface is observed as a result of dye conversion of the pigment contained in the ink.

A: no bleeding observed at boundaries on the printed surface
B: some bleeding observed at boundaries on the printed surface
C: marked bleeding at the boundaries on the printed surface (Light Resistance)

Using each ink, a printed item was produced in the same manner as that described above for the drying rate.

The printed item was then installed in a weather resistance test device (Weather-Ometer Ci4000, manufactured by Atlas Material Testing Technology LLC), and irradiated for 72 hours with light having a wavelength of 300 to 400 nm and an illuminance of 36 W/m². The fading from before irradiation to after irradiation was evaluated visually against the following criteria.

A: almost no fading
B: some fading is noticeable
C: marked fading is evident

TABLE 1

| | Ink formulations and evaluation results | | | | | | | | |
|---|---|---|---|---|---|---|---|---|---|
| | Units: % by mass | Example 1 | Example 2 | Example 3 | Example 4 | Example 5 | Example 6 | Example 7 |
| Pigments | P.R. 81; xanthene-based basic dye lake | 10 | 10 | 10 | 10 | 10 | 10 | 10 |
| | P.R. 81:4; xanthene-based basic dye lake | — | — | — | — | — | — | — |
| | P.R. 169; xanthene-based basic dye lake | — | — | — | — | — | — | — |
| | P.V. 3; methyl violet-based basic dye lake | — | — | — | — | — | — | — |
| | P.B. 1; triphenylmethane-based basic dye lake | — | — | — | — | — | — | — |
| | P.O. 17; Persian orange-based acidic dye lake | — | — | — | — | — | — | — |
| | P.O. 13; pyrazolone | — | — | — | — | — | — | — |
| | P.R. 122; quinacridone | — | — | — | — | — | — | — |

TABLE 1-continued

Ink formulations and evaluation results

|  | Units: % by mass | Example 1 | Example 2 | Example 3 | Example 4 | Example 5 | Example 6 | Example 7 |
|---|---|---|---|---|---|---|---|---|
| Dispersants | S18000 | 10 | 10 | 10 | 10 | 10 | 10 | 10 |
|  | Disperbyk 2155 | — | — | — | — | — | — | — |
| Solvents | 1) alkyl-modified silicone [20.7 mN/m] | 80 | — | — | — | — | — | — |
|  | 2) carboxylate ester-modified silicone [23.2 mN/m] | — | 80 | — | 50 | 50 | 70 | 65 |
|  | 3) aryl-modified silicone [27.4 mN/m] | — | — | 80 | — | — | — | — |
|  | 4) dimethyl silicone [19.7 mN/m] | — | — | — | — | — | — | — |
|  | 5) petroleum-based hydrocarbon solvent [28.0 mN/m] | — | — | — | 30 | — | — | — |
|  | 6) isotridecyl isononanoate [29.3 mN/m] | — | — | — | — | 30 | — | 10 |
|  | 7) isoeicosyl alcohol [31.0 mN/m] | — | — | — | — | — | 10 | 5 |
|  | Total (% by mass) | 100 | 100 | 100 | 100 | 100 | 100 | 100 |
|  | Ratio of silicone relative to total mass of solvent (% by mass) | 100 | 100 | 100 | 62.5 | 62.5 | 87.5 | 81.25 |
|  | Ratio of higher alcohol relative to total mass of solvent (% by mass) | 0 | 0 | 0 | 0 | 0 | 12.5 | 6.25 |
|  | Silicone oil surface tension [mN/m] | 20.7 | 23.2 | 27.4 | 23.2 | 23.2 | 23.2 | 23.2 |
| Evaluations | Storage stability | A | A | A | A | A | A | A |
|  | Wetting characteristics of ink on nozzle plate | B | A | A | A | A | S | S |
|  | Drying rate | A | A | B | B | B | A | A |
|  | Bleeding | A | A | A | A | A | A | A |
|  | Light resistance | A | A | A | A | A | A | A |

TABLE 2

Ink formulations and evaluation results

|  | Units: % by mass | Example 8 | Example 9 | Example 10 | Example 11 | Example 12 |
|---|---|---|---|---|---|---|
| Pigments | P.R. 81; xanthene-based basic dye lake | — | — | — | — | — |
|  | P.R. 81:4; xanthene-based basic dye lake | 10 | — | — | — | — |
|  | P.R. 169; xanthene-based basic dye lake | — | 10 | — | — | — |
|  | P.V. 3; methyl violet-based basic dye lake | — | — | 10 | — | — |
|  | P.B. 1; triphenylmethane-based basic dye lake | — | — | — | 10 | — |
|  | P.O. 17; Persian orange-based acidic dye lake | — | — | — | — | 10 |
|  | P.O. 13; pyrazolone | — | — | — | — | — |
|  | P.R. 122; quinacridone | — | — | — | — | — |
| Dispersants | S18000 | — | 10 | — | — | — |
|  | Disperbyk 2155 | 10 | — | 10 | 10 | 10 |
| Solvents | 1) alkyl-modified silicone [20.7 mN/m] | — | — | — | — | — |
|  | 2) carboxylate ester-modified silicone [23.2 mN/m] | 80 | 80 | 80 | 80 | 80 |
|  | 3) aryl-modified silicone [27.4 mN/m] | — | — | — | — | — |
|  | 4) dimethyl silicone [19.7 mN/m] | — | — | — | — | — |
|  | 5) petroleum-based hydrocarbon solvent [28.0 mN/m] | — | — | — | — | — |
|  | 6) isotridecyl isononanoate [29.3 mN/m] | — | — | — | — | — |
|  | 7) isoeicosyl alcohol [31.0 mN/m] | — | — | — | — | — |
|  | Total (% by mass) | 100 | 100 | 100 | 100 | 100 |
|  | Ratio of silicone relative to total mass of solvent (% by mass) | 100 | 100 | 100 | 100 | 100 |
|  | Ratio of higher alcohol relative to total mass of solvent (% by mass) | 0 | 0 | 0 | 0 | 0 |
|  | Silicone oil surface tension [mN/m] | 23.2 | 23.2 | 23.2 | 23.2 | 23.2 |
| Evaluations | Storage stability | A | A | A | A | B |
|  | Wetting characteristics of ink on nozzle plate | A | A | A | A | B |
|  | Drying rate | A | A | A | A | A |
|  | Bleeding | A | A | A | A | A |
|  | Light resistance | A | A | B | B | B |

TABLE 3

Ink formulations and evaluation results

|  | Units: % by mass | Comparative Example 1 | Comparative Example 2 | Comparative Example 3 | Comparative Example 4 | Comparative Example 5 | Comparative Example 6 |
|---|---|---|---|---|---|---|---|
| Pigments | P.R. 81; xanthene-based basic dye lake | 10 | 10 | 10 | 10 | — | — |
|  | P.R. 81:4; xanthene-based basic dye lake | — | — | — | — | — | — |
|  | P.R. 169; xanthene-based basic dye lake | — | — | — | — | — | — |
|  | P.V. 3; methyl violet-based basic dye lake | — | — | — | — | — | — |

TABLE 3-continued

Ink formulations and evaluation results

|  | Units: % by mass | Comparative Example 1 | Comparative Example 2 | Comparative Example 3 | Comparative Example 4 | Comparative Example 5 | Comparative Example 6 |
|---|---|---|---|---|---|---|---|
|  | P.B. 1; triphenylmethane-based basic dye lake | — | — | — | — | — | — |
|  | P.O. 17; Persian orange-based acidic dye lake | — | — | — | — | — | — |
|  | P.O. 13; pyrazolone | — | — | — | — | 10 | — |
|  | P.R. 122; quinacridone | — | — | — | — | — | 10 |
| Dispersants | S18000 | 10 | 10 | 10 | 10 | 10 | 10 |
|  | Disperbyk 2155 | — | — | — | — | — | — |
| Solvents | 1) alkyl-modified silicone [20.7 mN/m] | — | — | — | — | — | — |
|  | 2) carboxylate ester-modified silicone [23.2 mN/m] | — | — | — | — | 80 | 80 |
|  | 3) aryl-modified silicone [27.4 mN/m] | — | — | — | — | — | — |
|  | 4) dimethyl silicone [19.7 mN/m] | 80 | — | — | — | — | — |
|  | 5) petroleum-based hydrocarbon solvent [28.0 mN/m] | — | 80 | — | — | — | — |
|  | 6) isotridecyl isononanoate [29.3 mN/m] | — | — | 80 | — | — | — |
|  | 7) isoeicosyl alcohol [31.0 mN/m] | — | — | — | 80 | — | — |
|  | Total (% by mass) | 100 | 100 | 100 | 100 | 100 | 100 |
|  | Ratio of silicone relative to total mass of solvent (% by mass) | 0 | 0 | 0 | 0 | 100 | 100 |
|  | Ratio of higher alcohol relative to total mass of solvent (% by mass) | 0 | 0 | 0 | 100 | 0 | 0 |
|  | Silicone oil surface tension [mN/m] | 19.7 | — | — | — | 23.2 | 23.2 |
| Evaluations | Storage stability | A | A | A | A | C | C |
|  | Wetting characteristics of ink on nozzle plate | C | A | S | S | C | C |
|  | Drying rate | A | C | C | C | C | C |
|  | Bleeding | A | A | B | C | — | — |
|  | Light resistance | A | A | B | C | — | — |

TABLE 4

Non-aqueous solvent details

| Non-aqueous solvent | Surface tension (mN/m) | Product name/ manufacturer |
|---|---|---|
| 1) Alkyl-modified silicone | 20.7 | Dow Corning FZ-3196 Dow Corning Toray Co., Ltd. 3-octylheptamethyltrisiloxane |
| 2) Carboxylate ester-modified silicone | 23.2 | Synthesized in Production Example 1 |
| 3) Aryl-modified silicone | 27.4 | Synthesized in Production Example 2 |
| 4) Dimethyl silicone | 19.7 | KF-96L-5cs Shin-Etsu Chemical Co., Ltd. |
| 5) Petroleum-based hydrocarbon solvent | 28.0 | Exxsol D-130 Exxon Mobil Corporation |
| 6) Isotridecyl isononanoate | 29.3 | SALACOS 913 Nisshin OilliO Group, Ltd. |
| 7) Isoeicosyl alcohol | 31.0 | Tokyo Chemical Industry Co., Ltd. |

TABLE 5

Pigment details

| C.I. pigment number | Pigment | Product name/ manufacturer |
|---|---|---|
| P.R. 81 | xanthene-based basic dye lake | No. 9310 Pink Daido Chemical Industry Co., Ltd. |
| P.R. 81:4 | xanthene-based basic dye lake | 108 Fast Rose Pink Inagawa Pigment Co., Ltd. |
| P.R. 169 | xanthene-based basic dye lake | Fanal Pink D4810 BASF Corporation |
| P.V. 3 | methyl violet-based basic dye lake | 860 Fast Violet Inagawa Pigment Co., Ltd. |
| P.B. 1 | triphenylmethane-based basic dye lake | 1000 Fast Blue Conc Inagawa Pigment Co., Ltd. |
| P.O. 17 | Persian orange-based acidic dye lake | Sumikaprint Orange GR Sumika Color Co., Ltd. |
| P.O. 13 | pyrazolone | PIGMENT ORANGE G Sanyo Color Works, Ltd. |
| P.R. 122 | quinacridone | FASTOGEN SUPER MAGENTA RG DIC Corporation |

As shown in the above tables, each of the inks from the Examples exhibited a favorable result for each evaluation. Further, the initial viscosity for the ink of each Example was within a range from 5 to 15 mPa·s, confirming an appropriate viscosity.

In Examples 1 to 3, various silicone oils having surface tension values within the preferred range were used, and each of the evaluation results was favorable. Based on Examples 1 to 3, it was evident that a higher surface tension for the silicone oil reduced ink wetting of the nozzle plate and prevented ink discharge faults, whereas a lower surface tension for the silicone oil yielded a faster drying rate and superior fixability for the printed items.

In Examples 4 to 7, other non-aqueous solvents were used in combination with the silicone oils, and each of the evaluation results was favorable. Based on Examples 6 and 7, it was evident that by using isoeicosyl alcohol as a higher alcohol-based solvent together with a silicone oil, the wetting characteristics of the ink on the nozzle plate could be further improved.

In Examples 8 to 12, various dye lake pigments, and in each case, a favorable result was obtained for each evaluation. In Example 12, an acidic dye lake pigment was used, but by using this pigment in combination with a silicone oil having a surface tension within the preferred range, the storage stability and the wetting characteristics of the ink on the nozzle plate were able to be satisfactorily improved.

In Comparative Example 1, the surface tension of the dimethyl silicone used as the non-aqueous solvent was a low value of 19.7 mN/m, and the wetting characteristics of the ink on the nozzle plate deteriorated, and ink discharge faults occurred.

In Comparative Examples 2 to 4, the surface tension values for the petroleum-based hydrocarbon solvent, isotridecyl isononanoate and isoeicosyl alcohol used as the non-aqueous solvent were all high, and the drying rates of the printed items were slow, leading to problems of fixability.

In Comparative Examples 3 and 4, polar solvents were used for the non-aqueous solvent, and the bleeding and light resistance of the printed items deteriorated.

In Comparative Examples 5 and 6, pyrazolone and quinacridone respectively were used as comparative pigments, but satisfactory storage stability could not be achieved. In Comparative Examples 5 and 6, the dispersibility of the pigment was poor, the wetting characteristics of the ink on the nozzle plate deteriorated, and the drying rate of the printed items was also slow.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An oil-based inkjet ink comprising a dye lake pigment, a pigment dispersant and a non-aqueous solvent, wherein the non-aqueous solvent contains a silicone oil having a surface tension of at least 22 mN/m but not more than 28 mN/m at 23° C.

2. The oil-based inkjet ink according to claim 1, wherein the surface tension of the silicone oil is at least 22 mN/m but not more than 26 mN/m at 23° C.

3. The oil-based inkjet ink according to claim 1, comprising the silicone oil in an amount of at least 50% by mass relative to a total mass of the non-aqueous solvent, and further comprising an alcohol-based solvent of at least 6 carbon atoms in an amount of at least 2% by mass but not more than 15% by mass relative to a total mass of the non-aqueous solvent.

4. The oil-based inkjet ink according to claim 1, wherein the dye lake pigment is a basic dye lake pigment.

5. The oil-based inkjet ink according to claim 4, wherein the dye lake pigment is a xanthene-based basic dye lake pigment.

6. The oil-based inkjet ink according to claim 4, wherein the dye lake pigment is at least one pigment selected from the group consisting of C.I. Pigment Red 81, C.I. Pigment Red 81:4 and C.I. Pigment Red 169.

7. The oil-based inkjet ink according to claim 1, wherein the silicone oil contains a modified silicone oil having 2 to 6 silicon atoms in one molecule, having an organic group in which a carbon atom is bonded directly to a silicon atom and in which a total number of carbon atoms and oxygen atoms is at least 5, and having a total number of carbon atoms and oxygen atoms, contained within all of the organic groups in which the total number of carbon atoms and oxygen atoms is at least 5, that is from 5 to 20 within one molecule.

8. The oil-based inkjet ink according to claim 7, wherein the organic group in which a total number of carbon atoms and oxygen atoms is at least 5 that is contained in the modified silicone oil is at least one group selected from the group consisting of alkyl groups having at least 7 carbon atoms, carboxylate ester linkage-containing groups in which a total number of carbon atoms and oxygen atoms is at least 5, aromatic ring-containing groups having at least 6 carbon atoms, and alkylene groups having at least 7 carbon atoms.

9. The oil-based inkjet ink according to claim 7, wherein the modified silicone oil is a compound represented by general formula (X) shown below:

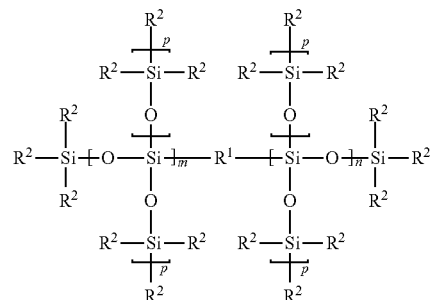

General formula (X)

wherein $R^1$ represents an oxygen atom or a divalent organic group having a carbon atom bonded directly to each silicon atom, each $R^2$ independently represents a monovalent organic group having a carbon atom bonded directly to a silicon atom, each of m and n independently represents an integer of 0 to 4, each p independently represents an integer of 0 to 2, a number of silicon atoms within one molecule is from 2 to 6, at least one of $R^1$ and $R^2$ is an organic group in which a total number of carbon atoms and oxygen atoms is at least 5, and a total number of carbon atoms and oxygen atoms, contained within all of the organic groups in which a total number of carbon atoms and oxygen atoms is at least 5, is from 5 to 20 within one molecule.

10. An oil-based inkjet ink comprising a dye lake pigment, a pigment dispersant and a non-aqueous solvent, wherein the non-aqueous solvent contains a silicone oil having a surface tension of at least 20 mN/m but not more than 28 mN/m at 23° C., and the silicone oil contains a modified silicone oil having 2 to 6 silicon atoms in one molecule, having an organic group in which a carbon atom is bonded directly to a silicon atom and in which a total number of carbon atoms and oxygen atoms is at least 5, and having a total number of carbon atoms and oxygen atoms, contained within all of the organic groups in which the total number of carbon atoms and oxygen atoms is at least 5, that is from 5 to 20 within one molecule.

11. The oil-based inkjet ink according to claim 10, wherein the organic group in which a total number of carbon atoms and oxygen atoms is at least 5 that is contained in the modified silicone oil is at least one group selected from the group consisting of alkyl groups having at least 7 carbon atoms, carboxylate ester linkage-containing groups in which a total number of carbon atoms and oxygen atoms is at least 5, aromatic ring-containing groups having at least 6 carbon atoms, and alkylene groups having at least 7 carbon atoms.

12. The oil-based inkjet ink according to claim 10, wherein the modified silicone oil is a compound represented by general formula (X) shown below:

General formula (X)

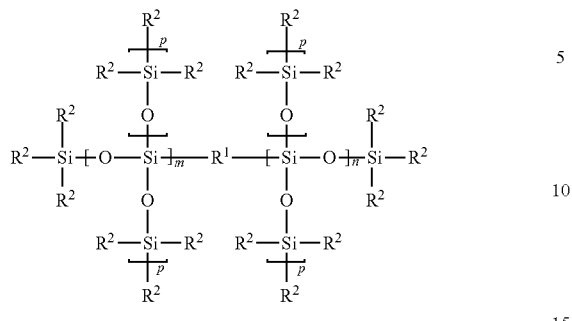

wherein $R^1$ represents an oxygen atom or a divalent organic group having a carbon atom bonded directly to each silicon atom, each $R^2$ independently represents a monovalent organic group having a carbon atom bonded directly to a silicon atom, each of m and n independently represents an integer of 0 to 4, each p independently represents an integer of 0 to 2, a number of silicon atoms within one molecule is from 2 to 6, at least one of $R^1$ and $R^2$ is an organic group in which a total number of carbon atoms and oxygen atoms is at least 5, and a total number of carbon atoms and oxygen atoms, contained within all of the organic groups in which a total number of carbon atoms and oxygen atoms is at least 5, is from 5 to 20 within one molecule.

* * * * *